United States Patent
Watanabe

(10) Patent No.: US 9,442,472 B2
(45) Date of Patent: Sep. 13, 2016

(54) ENGINE CONTROL DEVICE

(75) Inventor: Satoru Watanabe, Susono (JP)

(73) Assignee: TOYOTA JIDOSHA KABUSHIKI KAISHA, Toyota-Shi (JP)

( * ) Notice: Subject to any disclaimer, the term of this patent is extended or adjusted under 35 U.S.C. 154(b) by 0 days.

(21) Appl. No.: 14/364,388

(22) PCT Filed: Dec. 12, 2011

(86) PCT No.: PCT/JP2011/078691
§ 371 (c)(1),
(2), (4) Date: Jun. 11, 2014

(87) PCT Pub. No.: WO2013/088494
PCT Pub. Date: Jun. 20, 2013

(65) Prior Publication Data
US 2014/0343823 A1  Nov. 20, 2014

(51) Int. Cl.
*G06F 19/00* (2011.01)
*G06G 7/70* (2006.01)
(Continued)

(52) U.S. Cl.
CPC ........... *G05B 15/02* (2013.01); *F02D 41/2416* (2013.01); *F02D 41/26* (2013.01); *G06F 9/46* (2013.01); *G06F 12/084* (2013.01); *Y02T 10/46* (2013.01)

(58) Field of Classification Search
CPC .... G06F 1/324; G06F 12/084; G06F 15/167; G06F 15/781; G06F 15/7842; G06F 15/7846; G06F 1/3296; G06F 1/3206; B60W 10/06; F02D 37/02; F02D 11/105; F02D 2250/18; F02D 2250/21; Y02T 10/46
USPC ....... 701/102, 103, 104, 105, 106, 107, 108, 701/109, 110, 111, 112, 113, 114, 115
See application file for complete search history.

(56) References Cited

U.S. PATENT DOCUMENTS

| 4,729,358 A | 3/1988 | Morita et al. |
| 5,649,198 A | 7/1997 | Shibata |

(Continued)

FOREIGN PATENT DOCUMENTS

| EP | 2341448 A1 | 7/2011 |
| JP | 62-240441 A | 10/1987 |

(Continued)

OTHER PUBLICATIONS

T. Horie et al., "All-to-All Personalized Communication on a Wraparound Mesh," Transactions of Information Processing Society of Japan, vol. 34, No. 4 (1993), pp. 628-637, with English abstract.

*Primary Examiner* — Sizo Vilakazi
(74) *Attorney, Agent, or Firm* — Kenyon & Kenyon LLP

(57) ABSTRACT

Multiple lattice points arranged in a three-dimensional Cartesian coordinate system that takes first, second and third operating conditions as axes are associated with cores arranged in a lattice shape. A program for calculating a control value at the associated lattice points is allocated to the cores. Each core with which a lattice point is associated is configured so that, in a case where an operation space on the three-dimensional Cartesian coordinate system to which a current operating point belongs is a space defined by eight adjacent lattice points including a lattice point associated with the relevant core, the relevant core calculates a control value at the lattice point associated therewith by means of the calculation program and sends the control value to an interpolation calculation core. Further, if the operation space is not defined by the eight adjacent lattice points, the relevant core suspends calculation of the control value.

8 Claims, 6 Drawing Sheets

(51) Int. Cl.
*G05B 15/02* (2006.01)
*G06F 12/08* (2016.01)
*F02D 41/24* (2006.01)
*F02D 41/26* (2006.01)
*G06F 9/46* (2006.01)

(56) References Cited

U.S. PATENT DOCUMENTS

| | | | | |
|---|---|---|---|---|
| 6,082,334 A * | 7/2000 | Shomura | ............... | F02B 61/045 123/478 |
| 6,304,671 B1 * | 10/2001 | Kakutani | ............... | G06T 3/4007 358/523 |
| 8,738,860 B1 * | 5/2014 | Griffin | ............... | G06F 12/0897 711/122 |
| 2011/0213946 A1 * | 9/2011 | Ajima | ............... | G06F 15/803 712/11 |
| 2012/0216017 A1 * | 8/2012 | Inada | ............... | G06F 9/5066 712/30 |
| 2012/0265421 A1 * | 10/2012 | Livshiz | ............... | B60W 10/06 701/102 |

FOREIGN PATENT DOCUMENTS

| | | |
|---|---|---|
| JP | 11-191848 A | 7/1997 |
| JP | 9-198358 A | 7/1999 |
| JP | 11-280519 A | 10/1999 |
| JP | 2008-197776 A | 8/2008 |
| JP | 2008-269487 A | 11/2008 |
| JP | 2011-053876 A | 3/2011 |

* cited by examiner

ENGINE CONTROL DEVICE

CROSS-REFERENCE TO RELATED APPLICATIONS

This is a national phase application based on the PCT International Patent Application No. PCT/JP2011/078691 filed Dec. 12, 2011, the entire contents of which are incorporated herein by reference.

TECHNICAL FIELD

The present invention relates to a control device for an automobile engine that determines a control target value of an actuator based on a plurality of operating conditions, and more particularly relates to an engine control device that calculates a control target value of an actuator using a multi-core processor having a plurality of cores.

BACKGROUND ART

In recent years, the use of arithmetic devices in which a plurality of CPU cores are mounted on one semiconductor chip, that is, multi-core processors, has been proposed in various fields. The use of multi-core processors is also being studied in the field of automobile engine control, as disclosed, for example, in Japanese Patent Laid-Open No. 2008-269487. The technology disclosed in Japanese Patent Laid-Open No. 2008-269487 is directed at reducing electric power consumption when using a multi-core processor in an engine control device. According to this technology, when specific control processing is executed when engine control is stopped, an operation mode of a microcomputer is set to a low power consumption mode that is different to an operation mode when the engine is operating. In the low power consumption mode, the number of cores that the microcomputer uses is reduced in comparison to when the engine is operating. When engine control is stopped, no electric power is generated from an alternator or the like as in a case when the engine is operating, and charging of a battery mounted in the vehicle is not performed. Consequently, the greater the number of cores that operate when the specific control processing is executed, the faster the rate at which the charged power of the battery will be consumed.

One advantage of using a multi-core processor is that the multi-core processor exhibits a high processing capacity. A multi-core processor can provide a higher processing capacity compared to a single-core processor that has one CPU core. The high processing capacity exhibited by a multi-core processor is one motive for using a multi-core processor in an engine control device. This is because in recent years the number and kinds of actuators that are mounted in engines are increasing more and more. In order to appropriately control the operations of an engine, it is necessary to set control target values of the actuators to appropriate values that are in accordance with the operating conditions of the engine. Although the conventional engine control devices perform optimization computations for that purpose, the calculation load at such time increases in accordance with an increase in the number and kinds of actuators. Consequently, there has been a concern that the processing capacity of single-core processors used in the conventional engine control devices will soon be insufficient for processing such increasing calculation loads. Use of multi-core processors offers significant benefits to the field of engine control in which calculation loads are expected to increase more and more from now on.

However, the processing capacity of a multi-core processor is not simply determined by the number of cores. The plurality of cores must be operated efficiently to increase the processing capacity, and to achieve it is required to modify and improve the software that makes the cores operate. For example, although it is possible to distribute tasks to a plurality of cores and perform processing in parallel when using a multi-core processor, significant differences in the overall processing capacity arise depending on the parallelization technique, and this results in significant differences in the electric power consumption also.

CITATION LIST

Patent Literature

Patent Literature 1: Japanese Patent Laid-Open No. 2008-269487
Patent Literature 2: Japanese Patent Laid-Open No. 2011-053876
Patent Literature 3: Japanese Patent Laid-Open No. 2008-197776

Non Patent Literature

Non-Patent Literature 1: Takeshi Horie and Kenichi Hayashi, "Optimal All-to-All Communication Method in Torus Network," Transactions of Information Processing Society of Japan, vol. 34, no. 4, pp. 628-637, 1993

SUMMARY OF INVENTION

An object of the present invention is to enable calculation of a control target value of one or a plurality of actuators involved in engine control by a multi-core processor at a high speed and with a small amount of electric power consumption. To achieve this object, the present invention provides an engine control device that is described hereunder.

An engine control device provided by the present invention includes a multi-core processor in which a plurality of cores are arranged in a lattice shape. Here, the term "lattice" refers to a planar lattice, although there is no limitation on a pattern of the lattice. A pattern in which the cores are arranged may be a common square lattice or rectangular lattice, or may be another pattern such as a rhombic lattice.

A plurality of lattice points arranged in a three-dimensional Cartesian coordinate system that takes a first operating condition, a second operating condition and a third operating condition as axes are associated in a one-to-one relationship with a plurality of cores mounted in the multi-core processor. The first operating condition and the second operating condition are operating conditions that are particularly important for associating an operation variable of an actuator and a control variable of an engine, and one representative example thereof is a pair constituted by an engine speed and an engine load. Although the third operating condition is an arbitrary condition, the third operating condition may be an operating condition that should be prioritized on the basis of the current operating state of the engine. For example, it is possible to adopt the engine water temperature as the third operating condition during warm-up of the engine, and to change the third operating condition to the vehicle speed or the intake air temperature after warm-up is completed.

The cores with which lattice points arranged in the three-dimensional Cartesian coordinate system are associated need not be all of the cores mounted in the multi-core processor. For example, in a case where cores are arranged on a rectangular lattice of N rows×M columns, lattice points may be associated with only cores in a section of n rows×m columns that is one portion of the rectangular lattice. A calculation program is previously allocated to each core with which a lattice point is associated, and is used for calculating a control value of each actuator at a lattice point associated with the relevant core. In a case where the respective cores have a local memory, the allocated control value calculation program can be stored in the local memory. In such case, an interpolation calculation program for performing an interpolation calculation that is described later can also be stored in the local memory of the respective cores. Hereunder, among the cores mounted in the multi-core processor, a core to which a control value calculation program is allocated is referred to as a "control value calculation core". Note that it is preferable that the control value calculation program is a program that calculates an optimal control value by optimizing control.

A plurality of operation spaces are defined on the aforementioned three-dimensional Cartesian coordinate system by the plurality of lattice points that are arranged therein. Since a three-dimensional lattice pattern formed by the lattice points on the three-dimensional Cartesian coordinate system is a simple cubic lattice, a single operation space is defined by eight adjacent lattice points. A current operating point that is determined by the respective current values of the respective operating conditions belongs to one of the operation spaces in the three-dimensional Cartesian coordinate system.

The respective control value calculation cores are programmed so that, in a case where an operation space to which a current operating point belongs is a space defined by eight adjacent lattice points that include a lattice point associated with the relevant control value calculation core, the relevant control value calculation core calculates a control value at the lattice point associated therewith by means of the calculation program and sends the control value to an interpolation calculation core. Further, the respective control value calculation cores are also programmed so that, in a case where an operation space to which a current operating point belongs is not a space defined by eight adjacent lattice points that include a lattice point associated with the relevant control value calculation core, the relevant control value calculation core suspends calculation of a control value at the lattice point associated therewith. Note that an operation to check whether or not an operation space to which a current operating point belongs is a space defined by eight adjacent lattice points that include a lattice point associated with the relevant core is performed at fixed time steps (for example, for each control period of the engine) for each control value calculation core.

The interpolation calculation core is programmed to perform an interpolation calculation to calculate a control value at the current operation point using control values at eight adjacent lattice points that define an operation space to which the current operating point belongs. The multi-core processor outputs a control value at the current operating point that is obtained by the interpolation calculation performed by the interpolation calculation core as the control target value of an actuator.

That is, according to the present invention, the engine control device uses eight cores that are associated with eight adjacent lattice points that three-dimensionally surround a current operating point to calculate a control value at each of the lattice points, and performs an interpolation calculation to calculate a control value at the current operating point based on the calculation result. Consequently, because the calculation of control values at the respective lattice points is performed in parallel by separate cores, the time required to calculate the control target value of an actuator is significantly reduced in comparison to a case in which the conventional single-core processor is used. Further, because the engine control device suspends the calculation of control values for cores other than the eight cores associated with the eight adjacent lattice points, electric power consumption can be suppressed while enabling high-speed calculation of a control target value of an actuator.

In this connection, lattice points arranged in a three-dimensional Cartesian coordinate system and cores on a plane can be randomly associated, and can also be associated according to a fixed rule. However, when passing data for control values calculated at each core to the interpolation calculation core, a communication delay arises that is in accordance with a physical distance from the interpolation calculation core. When taking this point into consideration, it is preferable to associate the lattice points and the cores in accordance with the following rule.

According to the preferable rule, a plurality of core group that include four adjacent cores are set. Further, four consecutive lattice points at which respective coordinates of the first and second operating conditions are identical and coordinates of the third operating condition are different are associated with the respective core groups. Furthermore, the respective core groups are arranged in an identical order as lattice points in a two-dimensional Cartesian coordinate system that takes the first operating condition and the second operating condition as axes. If the association of lattice points and cores is performed in accordance with this rule, since the control values at the respective lattice points are calculated by eight cores that are also physically close to each other, differences in communication delay times between cores can be reduced. By reducing differences in the communication delay times, it is possible to calculate control values with a high level of efficiency in the processor overall.

Further, when the association of lattice points and cores is performed according to the above described rule, it is more preferable to interchange lattice points that the respective cores are responsible for in sequential order within the core group. It is thereby possible to prevent deterioration of cores that is cause by a calculation load being concentrated at some cores. The interchange of lattice points that the respective cores are responsible for may be performed, for example, after every predetermined amount of driving trips.

Any core can be fixed as a core that functions as the interpolation calculation core. In this case, any one core among the control value calculation cores may be set as the interpolation calculation core, or the interpolation calculation core may be selected from among cores other than the control value calculation cores. However, if the association of lattice points and cores is performed according to the above described rule, it is more preferable to dynamically change the core that functions as the interpolation calculation core among the control value calculation cores. In such case, the respective control value calculation cores are programmed to execute the following processing in a case where an operation space to which the current operating point belongs is a space that is defined by eight adjacent lattice points that include a lattice point with which the relevant control value calculation core is associated.

First, the respective control value calculation cores determine whether or not a lattice point associated therewith is a representative lattice point among the eight adjacent lattice points that define the operation space to which the current operating point belongs. Hereunder, a core corresponding to a representative lattice point is referred to as a "representative core". In a case where the respective control value calculation cores determine that the relevant control value calculation core is not a representative core, the relevant control value calculation core sends a control value at a lattice point that is associated therewith to another core that is the representative core. On the other hand, if the relevant core is the representative core, the relevant core receives control values calculated at the respective cores with which the other lattice points that define the operation space to which the current operating point belongs are associated from the respective cores. The relevant core then calculates a control value at the current operating point by performing an interpolation calculation by means of the interpolation calculation program based on the control values at the eight adjacent lattice points that define the operation space to which the current operating point belongs. By programming the respective cores to perform the above described processing, not only can a difference between communication delay times among the cores be reduced, but the communication delay time itself can also be decreased.

DESCRIPTION OF EMBODIMENTS

An engine control device according to an embodiment of the present invention is described hereunder with reference to the accompanying drawings.

An engine control device to which the present invention is applied is a device that calculates control target values of actuators involved in engine control using a multi-core processor. In the present invention, there is no limitation with respect to the kind or structure of an automobile engine controlled by the engine control device, and there is also no limitation with respect to the kind or number of actuators. For example, the engine control device of the present embodiment may be a control device for a gasoline engine. In such case, the engine control device calculates control target values of actuators such as a throttle, an ignition device, an injector, an EGR valve, a variable valve mechanism and a waste gate valve. The engine control device of the present embodiment may also be a control device for a diesel engine. In such case, the engine control device calculates control target values of actuators such as an injector, an EGR valve, a diesel throttle and a variable nozzle turbocharger.

Figure 1:
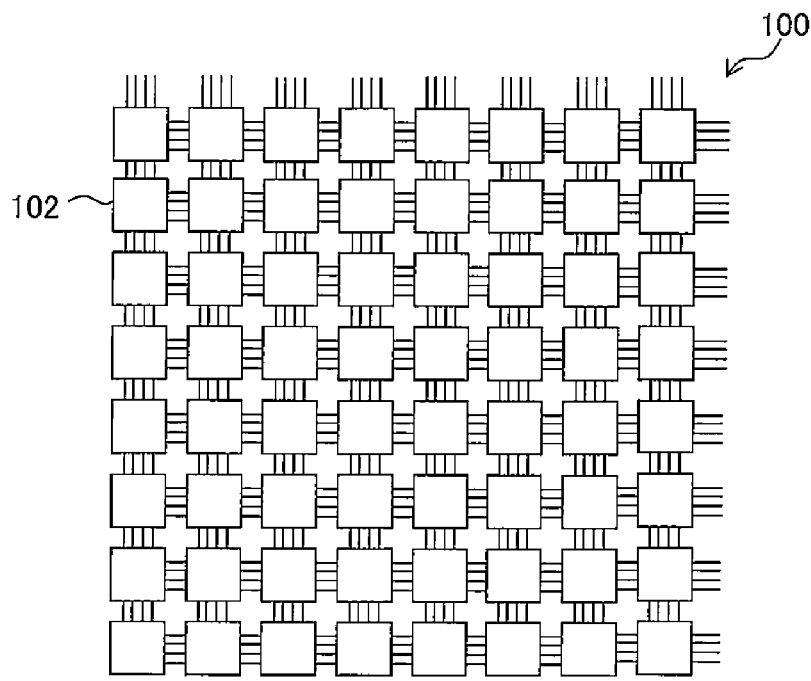
FIG. 1 is a view illustrating an array of cores of a multi-core processor according to an embodiment of the present invention.
Figure 2:
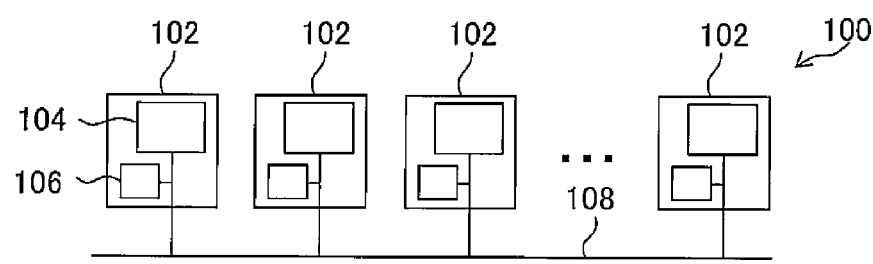
FIG. 2 is a view illustrating an outline of the hardware architecture of the multi-core processor according to the embodiment of the present invention.

FIG. 1 is a view that illustrates an array of cores of a multi-core processor of the engine control device of the present embodiment. A multi-core processor 100 according to the present embodiment has a structural characteristic that a large number of cores 102 are arranged in a lattice shape. The number of cores 102 is one-hundred or more, and the multi-core processor 100 is also referred to as a "many-core processor". FIG. 2 is a view that illustrates an outline of the hardware architecture of the multi-core processor 100. Each core 102 includes a CPU 104 with a cache and a local memory 106, and the cores 102 are connected to each other by a bus 108. Various programs to be executed by the CPU 104 as well as various kinds of data that is used when executing such programs are stored in the local memory 106. Although not illustrated in the drawings, a shared memory that is shared among the cores is also connected to the bus 108.

Figure 3:
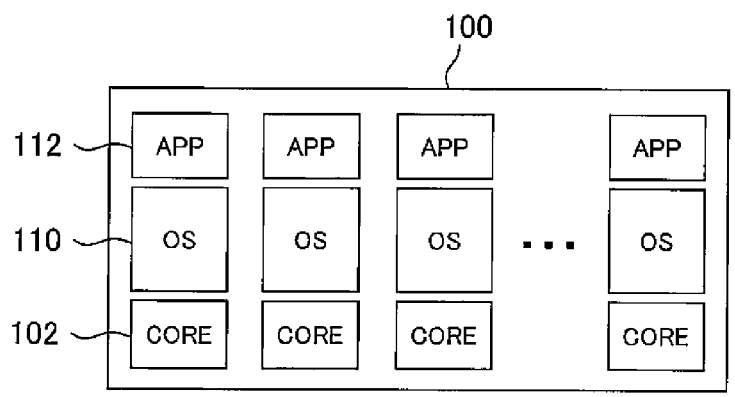
FIG. 3 is a view illustrating an outline of the software architecture of the multi-core processor according to the embodiment of the present invention.

FIG. 3 is a view that illustrates an outline of the software architecture of the multi-core processor 100. In the multi-core processor 100, different OSs 110 run on the respective cores 102. Further, different applications 112 run on the respective OSs 110. An optimal control value calculation program and an interpolation calculation program that are described later are each one of the applications 112. The OS 110 and the applications 112 related to each core 102 are installed in the local memory 106 for each core 102. In the multi-core processor 100 having this software architecture, each core 102 can independently execute the relevant application 112. In a case where a calculation result obtained by another core 102 or data possessed by another core 102 is required to execute the application 112, an exchange of data is performed by inter-core communication (inter-OS communication) through the bus 108.

The engine control device of the present embodiment acquires the respective current values for three operating conditions that are important for associating an operation variable of an actuator and a control variable of the engine, and determines a control target value of the respective actuators based thereon. The first operating condition and the second operating condition that are particularly important among the three operating condition are the engine speed and the engine load, and the third operating condition is the engine water temperature. If the engine speed, the engine load and the engine water temperature are determined, control target values for the respective actuators that can optimize the operating state of the engine can be identified. Adaptive data that is obtained by actually testing an engine can be used when identifying the control target values. However, a vast amount of time and man-hours will be required for the adaptation work if it is attempted to obtain adaptive data for all combinations of an engine speed, an engine load and an engine water temperature. Therefore, according to the present invention, it is proposed that adaptive data be acquired for only specific combinations of the engine speed, engine load and engine water temperature, and that an interpolation calculation be performed for other combinations based on the acquired adaptive data. In the engine control device of the present embodiment, the calculation of actuator control target values utilizing an interpolation calculation is executed in parallel by the multi-core processor 100.

Figure 4:
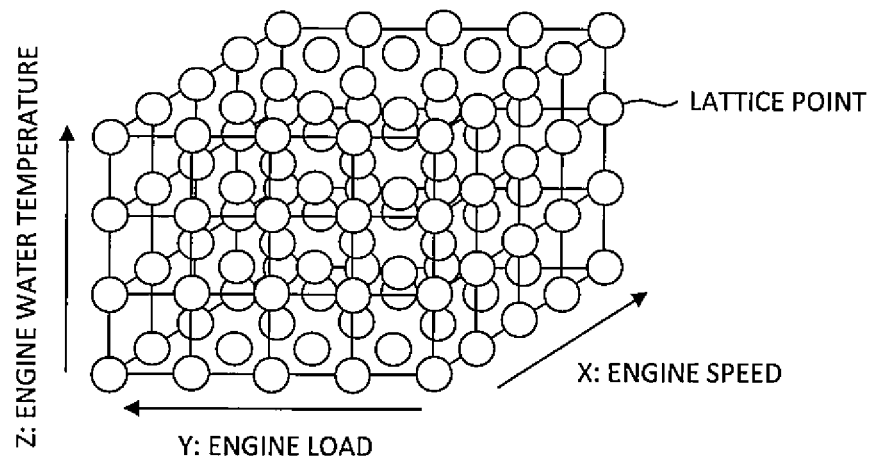
FIG. 4 is a view illustrating an array of lattice points on a three-dimensional Cartesian coordinate system that takes an engine speed, an engine load and an engine water temperature as axes.

The adaptive data used by the multi-core processor 100 is prepared for combinations of the engine speed, engine load and engine water temperature that are indicated by lattice points in FIG. 4. FIG. 4 is a view that illustrates an array of lattice points on a three-dimensional Cartesian coordinate system that takes the engine speed as the X-axis, the engine load as the Y-axis and the engine water temperature as the Z-axis. In the three-dimensional Cartesian coordinate system shown in FIG. 4, one-hundred lattice points are arranged in five rows, five columns and four levels. The three-dimensional lattice pattern formed by the lattice points on the three-dimensional Cartesian coordinate system is a simple cubic lattice, and a single operation space is defined by eight lattice points that are disposed at apexes of a cube that is a unit lattice. The respective lattice points are associated with adaptive data which was adapted to the engine speed, engine load and engine water temperature at the position of the relevant lattice point. The adaptive data at each lattice point is incorporated into the optimal control value calculation program and allocated to the core 102 with which the relevant lattice point is associated.

Figure 5:
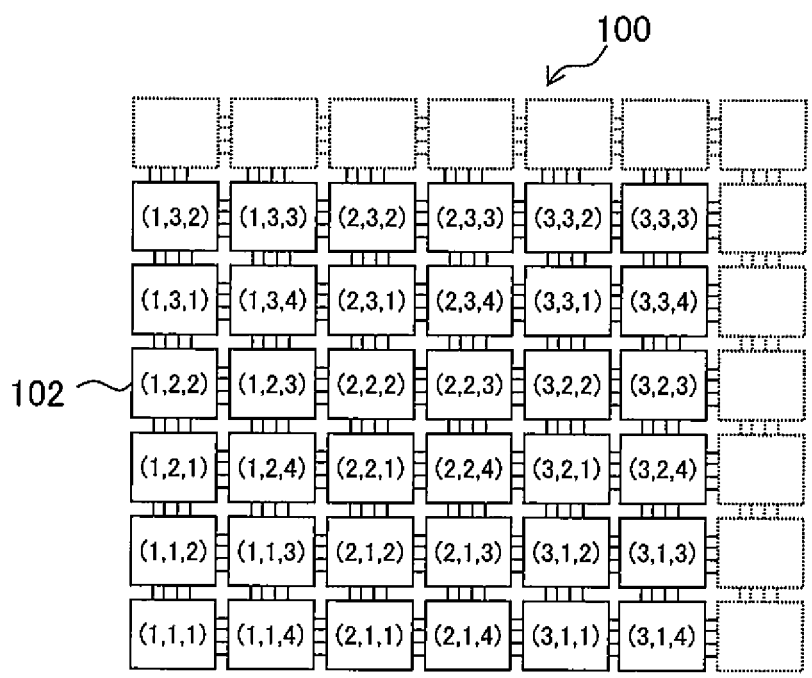
FIG. 5 is a view illustrating a manner in which a plurality of lattice points arranged in a three-dimensional Cartesian coordinate system and a plurality of cores on a multi-core processor are associated.

FIG. 5 is a view illustrating the manner in which lattice points arranged in the three-dimensional Cartesian coordinate system shown in FIG. 4 and cores 102 on the multi-core processor 100 are associated. Numbers assigned to some cores among the cores 102 mounted in the multi-core processor 100 are coordinate numbers of the lattice points with which the respective cores are associated. Hence, a core to which the numbers (2, 1, 3) are assigned is associated with a lattice point whose X-coordinate is 2, whose Y-coordinate is 1 and whose Z-coordinate is 3. FIG. 5 does not show associations between all of the one-hundred lattice points shown in FIG. 4 and corresponding cores, and only shows associations between a total of thirty-six lattice points that are arranged in three rows, three columns and four levels that are close to the origin among the one-hundred lattice points shown in FIG. 4 and thirty-six cores. As will be understood from the coordinate numbers of the lattice points assigned to the respective cores 102 in FIG. 4, the lattice points and the cores 102 are associated in a one-to-one relationship. Note that depending on the relationship between the number of lattice points and the number of cores 102 of the multi-core processor 100, in some cases cores 102 with which lattice points are not associated remain. However, in the following description, it is assumed that the term "core 102" refers to a core with which a lattice point is associated. Further, in the following description, when referring to a specific core, the coordinate numbers of a lattice point associated with the core may be used.

Figure 6:
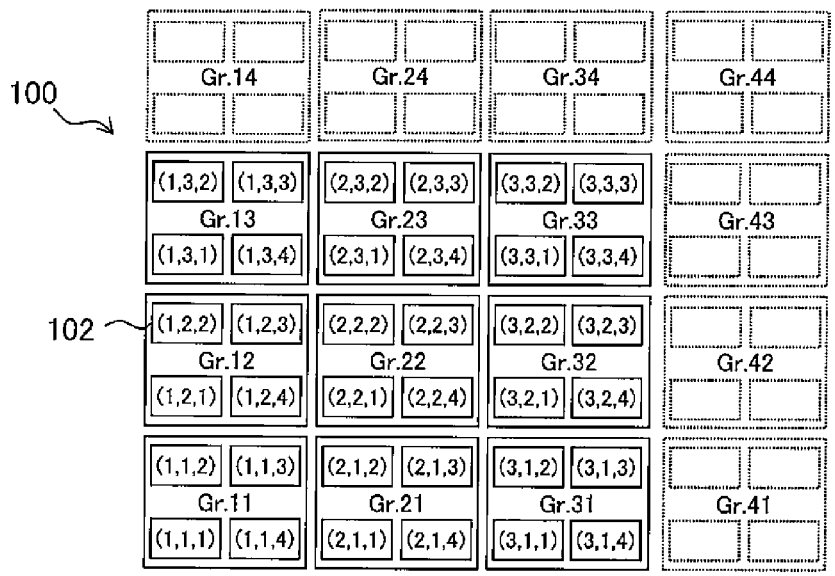
FIG. 6 is a view for describing in detail a method of associating a plurality of lattice points arranged in a three-dimensional Cartesian coordinate system with a plurality of cores on a multi-core processor.

In this connection, although the lattice points are arranged in a three-dimensional Cartesian coordinate system, the cores 102 are arranged in a two-dimensional Cartesian coordinate system, and therefore the array of lattice points can not be simply mapped onto the array of the cores 102. According to the present embodiment, association of the lattice points in the three-dimensional Cartesian coordinate system with the cores 102 in the two-dimensional Cartesian coordinate system is performed according to a fixed rule. FIG. 6 is a view for describing the rule in detail. Hereunder, the method of associating the lattice points in the three-dimensional Cartesian coordinate system with cores 102 on a plane that is adopted by the present embodiment is described using FIG. 6.

In FIG. 6, coordinate numbers of a lattice point are assigned to each core 102 in a similar manner to FIG. 5, and frames that surround four adjacent cores are drawn. The respective frames signify that a single group is created by the four cores 102 surrounded by the relevant frame. A number written in the center of each frame is the identification number of the relevant core group, and is also a number that indicates the contents of lattice points associated with the core group. Four consecutive lattice points for which the respective coordinates for the X-axis and Y-axis are identical, and the coordinates for the Z-axis are different are associated with the respective core groups. For example, four lattice points for which the X-coordinate is 1, the Y-coordinate is 1 and the Z-coordinates are from 1 to 4 are associated with the core group having the identification number Gr. 11. These four lattice points are assigned in order from the lattice point having the smallest Z-coordinate number to the respective cores in clockwise order starting from the core at the lower left position in the core group. Further, the respective core groups are arrayed in the same order as the lattice points in a two-dimensional Cartesian coordinate system that takes the engine speed as the X-axis and the engine load as the Y-axis. That is, the identification number of a core group is also the coordinates of the core group itself. For example, an identification number Gr. 32 means that the relevant core group is the third group in the X-axis direction and the second group in the Y-axis direction.

The optimal control value calculation program is allocated to each core 102 with which a lattice point is associated. The optimal control value calculation program uses adaptive data that was adapted to the engine speed, engine load and engine water temperature at the relevant lattice point. The optimal control value calculation program is installed in the local memory 106 together with the interpolation calculation program. The optimal control value calculation program is a program that calculates an optimal control value of an actuator using an engine characteristics model. The aforementioned adaptive data is used for the values of parameters of the engine characteristics model. In the multi-core processor 100 of the present embodiment, only the cores 102 with which lattice points are associated function as optimal control value calculation cores for calculating actuator control target values, and the other cores are responsible for other processing required for engine control.

Figure 7:
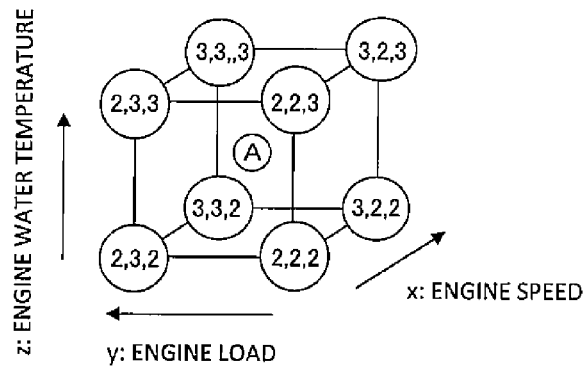
FIG. 7 is a view for describing a method of calculating a control target value of an actuator according to the embodiment of the present invention.
Figure 8:
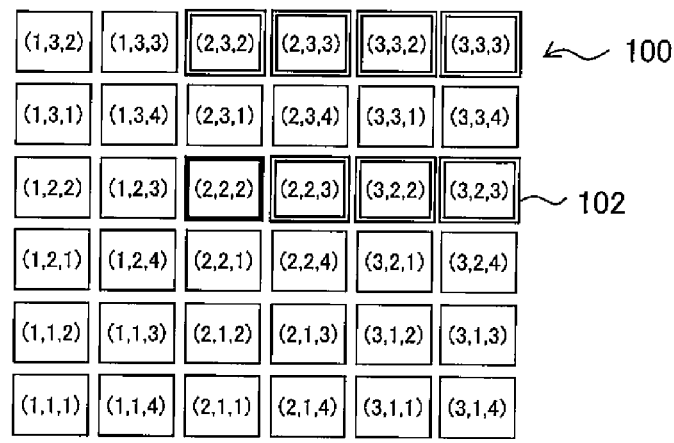
FIG. 8 is a view for describing a method of calculating a control target value of an actuator according to the embodiment of the present invention.

Next, a method for calculating a control target value of an actuator using the multi-core processor 100 is described using FIG. 7 and FIG. 8. In a three-dimensional Cartesian coordinate system shown in FIG. 7, a point A indicates an operating point that is determined by the current values of each of the engine speed, the engine load and the engine water temperature, that is, the current operating point. Here, the term "current" refers to current at the time of starting the present time step. In order to appropriately control the engine, it is necessary to calculate the optimal control values of actuators at the current operating point and set the calculated values as the control target values of the relevant actuators. However, in the three-dimensional Cartesian coordinate system, adaptive data for calculating optimal control values is only prepared for one-hundred lattice points arranged in five rows, five columns and four levels, and adaptive data is not prepared for regions other than that region. Hence, optimal control values at the current operating point can not be directly calculated by means of the optimal control value calculation program.

Therefore, according to the present embodiment, optimal control values at eight lattice points that surround the current operating point are calculated, and those optimal control values are used to perform an interpolation calculation to calculate an optimal control value at the current operating point. According to the example shown in FIG. 7, the current operating point A belongs to a space defined by the lattice points with the coordinates (2, 2, 2), the coordinates (2, 3, 2), the coordinates (3, 2, 2), the coordinates (2, 2, 3), the coordinates (2, 3, 3), the coordinates (3, 2, 3), the coordinates (3, 3, 2) and the coordinates (3, 3, 3). Hence, if the optimal control values at these eight adjacent lattice points can be known, the optimal control value at the current operating point A can be obtained by interpolation calculation using the optimal control values at the eight adjacent lattice points.

Specifically, the optimal control value at the current operating point A is calculated by the following procedure. First, in the array of cores shown in FIG. 8, the multi-core processor 100 uses the cores 102 denoted by numbers (2, 2, 2), (2, 3, 2), (3, 2, 2), (2, 2, 3), (2, 3, 3), (3, 2, 3), (3, 3, 2) and (3, 3, 3) among the cores 102 with which lattice points are associated. Each of these eight cores calculates an optimal control value at the lattice point associated therewith by means of the optimal control value calculation program installed in the local memory 106 of the relevant core. At this time, calculation of the optimal control values by the eight cores is performed in parallel. When calculation of the optimal control values at the eight cores is completed, the data for the calculation results is collected by a representative core among the eight cores. Each core 102 is programmed to recognize the lattice point that is nearest the origin in the three-dimensional Cartesian coordinate system among the eight adjacent lattice points that surround the current operating point as being the representative lattice point, and to recognize the core associated with the representative lattice point as being the representative core. In the example shown in FIG. 8, the core denoted by (2, 2, 2) is the representative core. The core (2, 2, 2) that is the representative core uses the data of the optimal control value calculated by itself and the data of the optimal control values received from the other seven cores to perform an interpolation calculation to calculate the optimal control value at the current operating point A by means of the interpolation calculation program that is installed in the local memory 106 of the representative core (2, 2, 2) itself.

According to the above described method, optimal control values at the eight adjacent lattice points that are required to perform an interpolation calculation are respectively calculated in parallel by separate cores. Consequently, the time required to calculate a control target value of an actuator can be significantly reduced in comparison to a case in which the conventional single-core processor is used.

In addition, by associating the lattice points and cores according to the aforementioned rule, calculation of the optimal control values at the eight adjacent lattice points can be performed by eight cores that are also physically close to each other. Further, one of the eight cores functions as the interpolation calculation core. Therefore, not only is it possible to reduce differences in a communication delay time that arises when passing data of the optimal control value calculated at each core to the interpolation calculation core, but the communication delay time itself can also be decreased.

Figure 9:
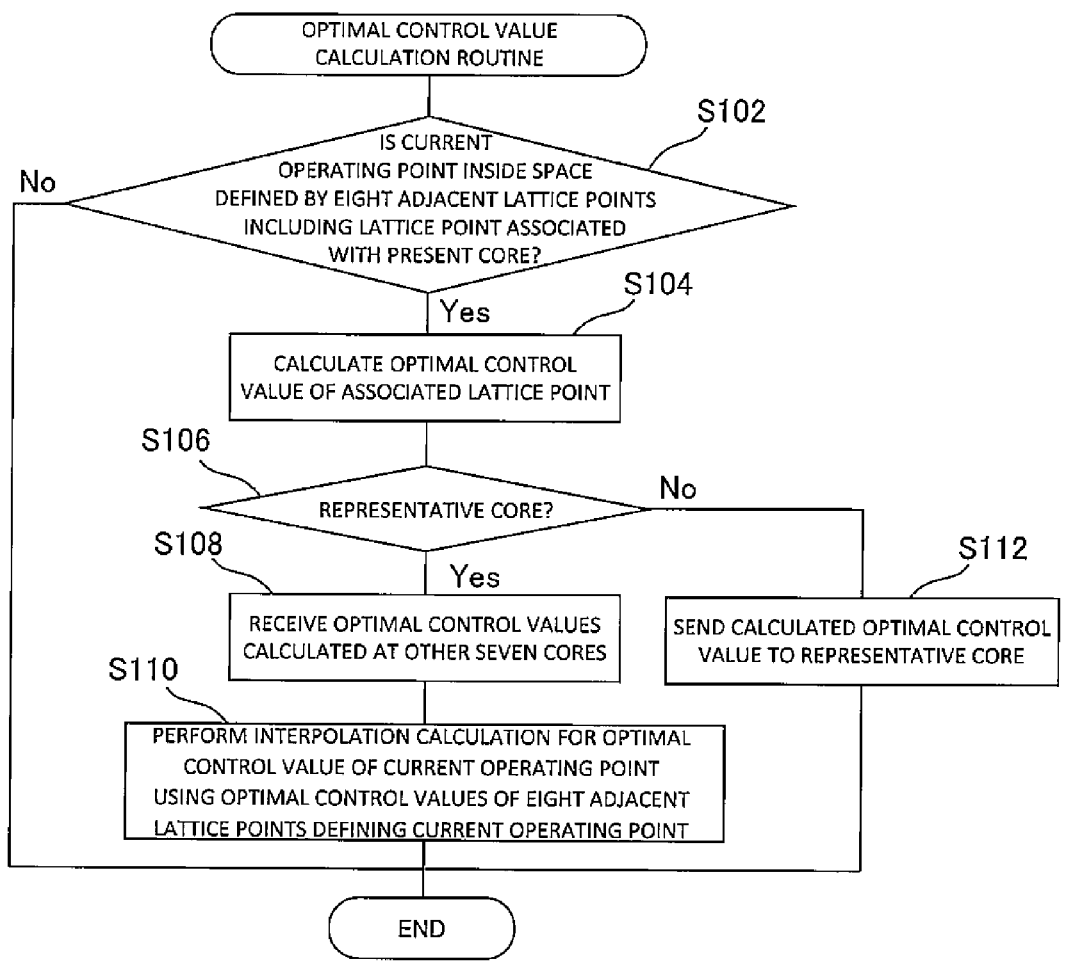
FIG. 9 is a flowchart illustrating an optimal control value calculation routine that is executed by each core in the embodiment of the present invention.

The above described method is implemented by each core 102 executing an optimal control value calculation routine shown in the flowchart of FIG. 9. This routine is executed at fixed time steps (for example, for each control period of the engine) for each core 102 by an application installed in the local memory 106 of the respective cores 102.

In step S102 that is the initial step in the flowchart in FIG. 9, the core 102 acquires the current values of the engine speed, the engine load and the engine water temperature, respectively. These values are calculated based on the output values of sensors by a core other than an optimal control value calculation core. Next, the core 102 identifies the current operating point based on the respective current values of the engine speed, the engine load and the engine water temperature, and determines whether or not the current operating point is in a space defined by eight adjacent lattice points that include a lattice point that is associated with the relevant core 102.

If the result determined in step S102 is negative, the core 102 suspends calculation of the optimal control value and ends the calculation at the present time step. This is done to suppress needless power consumption.

If the result determined in step S102 is affirmative, the core 102 executes the processing in step S104. In step S104, the core 102 executes the optimal control value calculation program to calculate the optimal control value at the lattice point that is associated with the relevant core 102.

In the subsequent step S106, the core 102 determines whether or not the core 102 itself corresponds to the representative core. The core 102 can determine whether or not the core 102 itself is the representative core based on the positional relationship between the lattice point associated with the core 102 and the current operating point.

If the result determined in step S106 is negative, the core 102 executes the processing in step S112. In step S112, the core 102 sends the data of the optimal control value that the relevant core 102 calculated to the representative core. The core 102 can determine which core corresponds to the representative core based on the coordinates of the current operating point in the three-dimensional Cartesian coordinate system. Upon sending the optimal control value data, the calculation performed by the relevant core 102 in the present time step ends.

If the result determined in step S5106 is affirmative, the core 102 executes the processing in step S108. In step S108, the core 102 receives data of the optimal control values calculated by the respective cores from the other seven cores that the other lattice points that define the operation space to which the current operating point belongs are associated with.

Next, in step S110, the core 102 as the representative core performs an interpolation calculation to calculate the optimal control value at the current operating point by means of the interpolation calculation program based on the optimal control values at the eight adjacent lattice points including the optimal control value that was calculated by the core 102 itself. The optimal control value at the current operating point obtained by the interpolation calculation is output as a control target value of an actuator. The calculation performed by the relevant core 102 in the present time step then ends.

By executing the above described routine at each of the cores 102, the electric power consumption can be suppressed while enabling high-speed calculation of a control target value of an actuator.

In this connection, a characteristic that an operation frequency differs for each operating condition may be mentioned as a characteristic of an automobile engine to which the control device of the present invention is applied. For example, generally an operating time period before warming up is shorter than an operating time period after warming up, and an idle operation time period is shorter than a time period when operating under a full load. This means that a space in which the operation frequency is high and a space in which the operation frequency is low also exist in a three-dimensional Cartesian coordinate system that takes the engine speed, the engine load and the engine water temperature as axes. In this case, the calculation load at a core with which a lattice point belonging to a space in which the operation frequency is high is associated is relatively high in comparison to other cores. If the calculation load is concentrated at specific cores, it will lead to deterioration of the relevant cores and will shorten the life of the overall multi-core processor 100.

Figure 10:
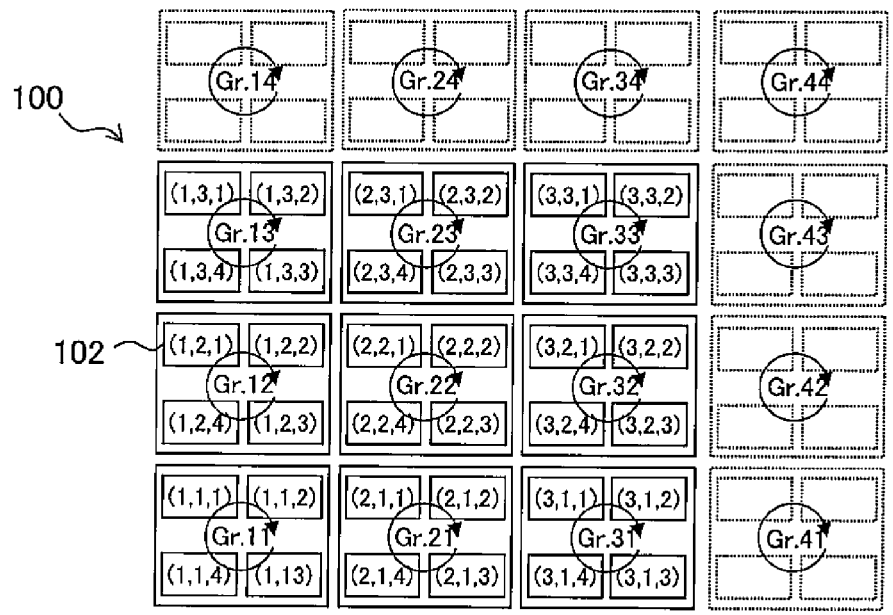
FIG. 10 is a view for describing a method for rotating a core allocation within a core group according to the embodiment of the present invention.

Therefore, according to the engine control device of the present embodiment, as shown in FIG. 10, lattice points that the respective cores are responsible for are interchanged in sequential order within the core group. That is, rotation of the core allocation is performed. Although, as indicated by the arrows, rotation is performed in the clockwise direction in the example shown in FIG. 10, rotation can also be performed in the counter-clockwise direction.

Figure 11:
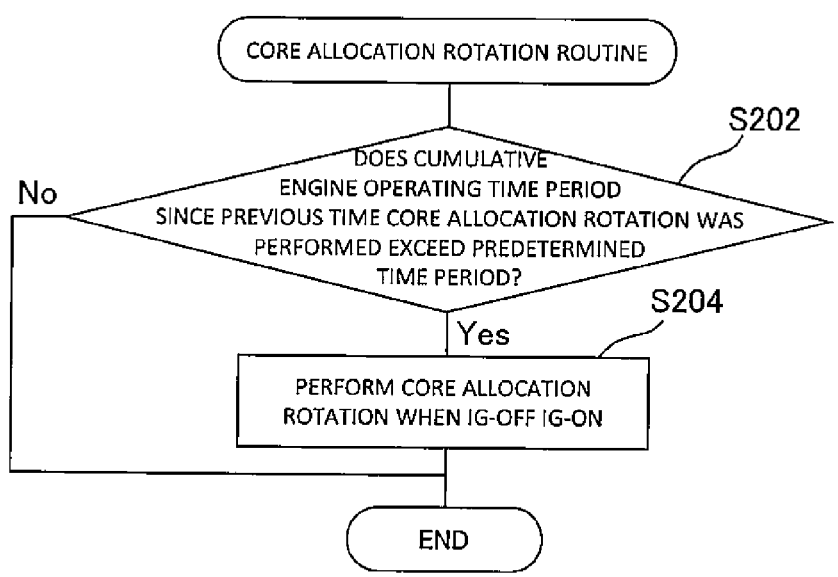
FIG. 11 is a flowchart illustrating a core allocation rotation routine that is executed by each core in the embodiment of the present invention.

Rotation of the allocation of cores is carried out by execution of a core allocation rotation routine shown in the flowchart in FIG. 11 at each core 102. In step S202 that is the initial step of the routine, the core 102 determines whether or not the cumulative operating time period of the engine from the previous time that core allocation rotation was performed has exceeded a predetermined time period. If the result determined in step S202 is affirmative, the processing in step S204 is executed. In step S204, rotation of the core allocation is executed at a timing that coincides with the timing at which the ignition is switched on when starting the present engine operation. By performing core allocation rotation after every predetermined amount of driving trips in this manner, it is possible to prevent deterioration of cores that is caused by a calculation load being concentrated at some cores. Note that this routine is executed by an application installed in the local memory 106 of the respective cores 102.

Other Embodiments

The present invention is not limited to the above described embodiment, and various modifications can be made without departing from the spirit and scope of the present invention. For example, the present invention may be modified and implemented in the following manner.

Figure 12:
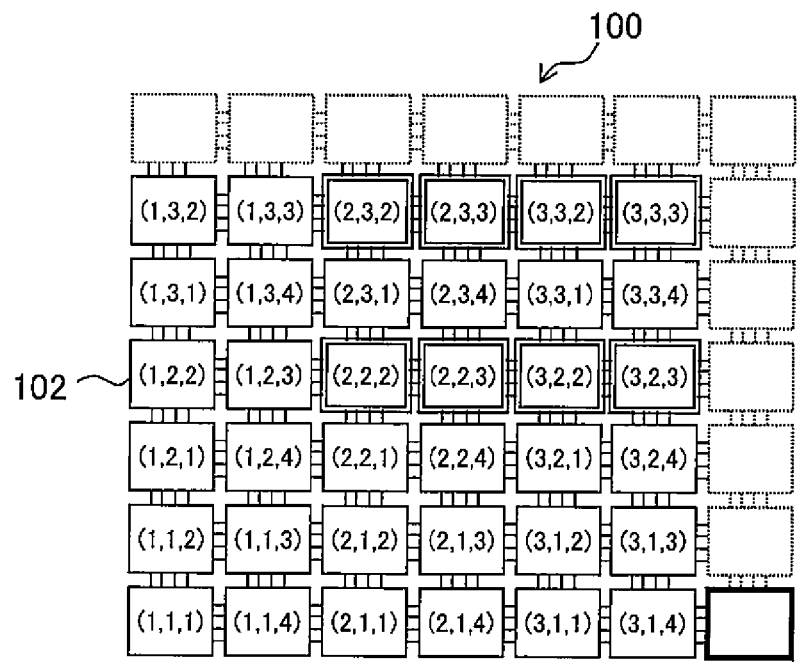
FIG. 12 is a view for describing a method of calculating a control target value of an actuator according to modification 1 of the embodiment of the present invention.
Figure 13:
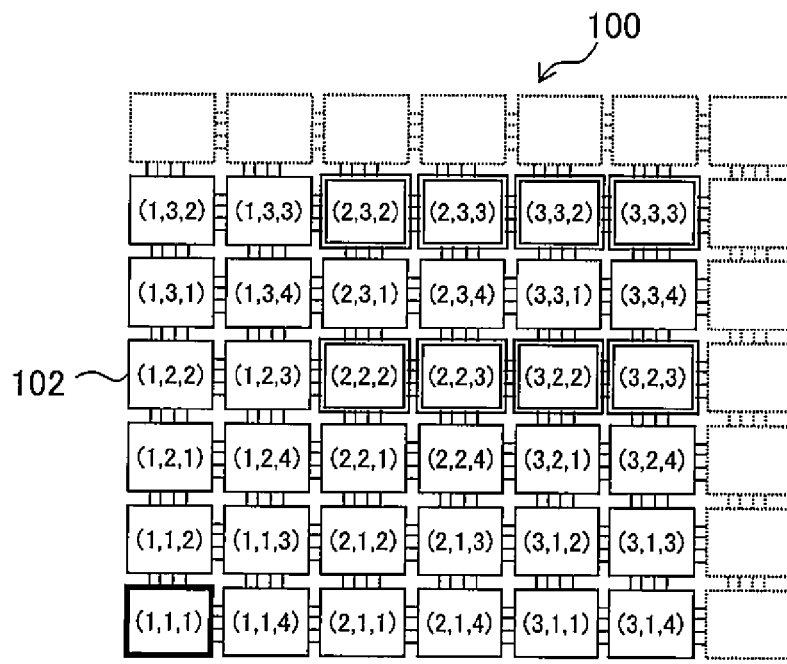
FIG. 13 is a view for describing a method of calculating a control target value of an actuator according to modification 2 of the embodiment of the present invention.

In the above described embodiment, interpolation calculation is performed at a representative core that is selected from among the cores that calculated an optimal control value. However, it is also possible to perform the interpolation calculation at another core. For example, FIG. 12 and FIG. 13 illustrate a modification of the above described embodiment, respectively. As shown in the modification in FIG. 12, any single core other than the cores 102 with which lattice points are associated can be adopted as an interpolation calculation core. Alternatively, as shown in the modification in FIG. 13, any single core among the cores 102 with which lattice points are associated can be fixed as an interpolation calculation core. In these modifications, a communication delay time when sending the data of the optimal control values calculated at the respective cores to the interpolation calculation core will increase in accordance with the physical distance from the interpolation calculation core. However, since the calculation of optimal control values that are used in the interpolation calculation is performed at cores that are physically close to each other, differences in the communication delay time between the cores are small. Because the differences in the communication delay time are small, calculation can be performed with high efficiency with respect to the entire multi-core processor.

The cores with which lattice points are associated may be some of or all of the cores mounted in the multi-core processor. If lattice points are associated with all of the cores mounted in the multi-core processor, other processing that is required for engine control can be assigned to cores at which the average load is comparatively small among the cores with which the lattice points are associated. Note that the number of cores in the multi-core processor is preferably four or more, and more preferably is nine or more, and there is no specific limit to the number of cores. There is also no specific limit to the number of lattice points arranged in the three-dimensional Cartesian coordinate system as long as the number of lattice points is equal to or less than the number of cores mounted in the multi-core processor.

Among the three operating conditions used when determining the control target value of an actuator, the third operating condition may be changed according to the state of the engine. For example, a configuration may be adopted in which, during a period until warm-up of the engine is completed, the engine water temperature is used as the third operating condition similarly to the above described embodiment, and after warm-up of the engine is completed, the intake air temperature is used as the third operating condition. The intake air temperature varies even after warm-up of the engine is completed. Consequently, the intake air temperature has a greater influence on the state of the engine in a situation in which warm-up has been completed than the engine water temperature. Hence, by changing the third operating condition from the engine water temperature to the intake air temperature after warm-up of the engine has been completed, it is possible to utilize the three-dimensional array of lattice points more effectively and thereby control the state of the engine with greater accuracy. The vehicle speed may also be utilized as the third operating condition in place of the intake air temperature after warm-up of the engine is completed. This is because the strength of the running wind differs depending on the vehicle speed, and consequently differences arise in the temperature of the exhaust system. In addition, any operating condition that continuously changes is also preferable as the third operating condition. For example, an air pressure or an EGR rate is suitable as the third operating condition.

REFERENCE SIGNS LIST

100 Multi-core processor
102 Core

104 CPU
106 Local memory
108 Bus
110 OS
112 Application

The invention claimed is:

1. An engine control device comprising a multi-core processor in which a plurality of cores are arranged in a lattice shape, and that calculates a control target value of one or a plurality of actuators using the multi-core processor, wherein:
- a plurality of lattice points that are arranged in a three-dimensional Cartesian coordinate system that takes a first operating condition, a second operating condition and a third operating condition as axes are associated in a one-to-one relationship with at least some of the plurality of cores, and a calculation program for calculating the control target value of the one or plurality of actuators at the associated lattice points is allocated to the at least some of the plurality of cores;
- each core with which a lattice point is associated is programmed so that, in a case where an operation space on the three-dimensional Cartesian coordinate system to which a current operating point belongs is a space defined by eight adjacent lattice points that include a lattice point associated with a relevant core, the relevant core calculates a control value at the lattice point associated therewith by means of the calculation program and sends the control value to an interpolation calculation core, and in a case where the operation space is not a space defined by eight adjacent lattice points that include a lattice point associated with the relevant core, the relevant core suspends calculation of the control value at the lattice point associated therewith;
- the interpolation calculation core is programmed to perform an interpolation calculation to calculate a control value at the operating point using control values at eight adjacent lattice points that define an operation space to which the operating point belongs; and
- the multi-core processor outputs the control value at the operating point that is obtained by the interpolation calculation as the control target value of the one or plurality of actuators,
wherein the engine control device is programmed to control the one or plurality of actuators based on the calculated control target value.

2. The engine control device according to claim 1, wherein:
- a plurality of core groups comprising four adjacent cores are set;
- four consecutive lattice points at which respective coordinates of the first and second operating conditions are identical and coordinates of the third operating condition are different are associated with the respective core groups; and
- the respective core groups are arranged in an identical order as lattice points in a two-dimensional Cartesian coordinate system that takes the first operating condition and the second operating condition as axes.

3. The engine control device according to claim 2, wherein the multi-core processor interchanges lattice points that the respective cores are responsible for in sequential order within the core group.

4. The engine control device according to claim 3, wherein the multi-core processor performs the interchange after every predetermined amount of driving trips.

5. The engine control device according to claim 2, wherein each core with which a lattice point is associated is programmed so that, in a case where an operation space on the three-dimensional Cartesian coordinate system to which a current operating point belongs is a space that is defined by a lattice point associated with the relevant core, and the relevant core is associated with a representative lattice point among the plurality of lattice points defining the operation space, the relevant core functions as the interpolation calculation core.

6. The engine control device according to claim 2, wherein the first operating condition and the second operating condition are an engine speed and an engine load.

7. The engine control device according to claim 6, wherein the third operating condition is an engine water temperature.

8. The engine control device according to claim 5, wherein:
- each of the plurality of cores comprises a CPU and a local memory that stores a program that is executed by the CPU; and
- the calculation program and an interpolation calculation program that is executed when the core is the interpolation calculation core are stored in the local memory.

* * * * *